United States Patent
Kim

(10) Patent No.: US 7,925,288 B2
(45) Date of Patent: Apr. 12, 2011

(54) DATA SHARING SYSTEM AND METHOD FOR HANDHELD TERMINALS OVER MOBILE COMMUNICATION NETWORK

(75) Inventor: Jeong Hoon Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 832 days.

(21) Appl. No.: 11/819,075

(22) Filed: Jun. 25, 2007

(65) Prior Publication Data

US 2008/0045142 A1    Feb. 21, 2008

(30) Foreign Application Priority Data

Jul. 6, 2006   (KR) .................. 10-2006-0063422

(51) Int. Cl.
    *H04B 7/00*  (2006.01)
(52) U.S. Cl. ....... 455/518; 455/519; 455/416; 455/41.2; 455/3.05; 455/90.2; 379/202.01; 370/260; 370/276; 348/14.09
(58) Field of Classification Search .................. 455/518, 455/519, 416, 418, 41.2, 3.05, 90.2, 67.13; 379/202.01, 88.19, 312; 370/260, 261, 270, 370/276, 352, 389, 395.2; 348/14.01, 14.09
See application file for complete search history.

(56) References Cited

U.S. PATENT DOCUMENTS

| | | | |
|---|---|---|---|
| 5,495,520 A * | 2/1996 | Kojima | 455/411 |
| 5,774,117 A * | 6/1998 | Kukkal et al. | 715/753 |
| 2004/0119814 A1* | 6/2004 | Clisham et al. | 348/14.08 |
| 2004/0174817 A1* | 9/2004 | Jabri et al. | 370/238 |
| 2006/0041923 A1 | 2/2006 | McQuaide, Jr. | 725/131 |
| 2006/0062544 A1 | 3/2006 | Southwood et al. | 386/46 |
| 2006/0203083 A1 | 9/2006 | Wilson, Jr. et al. | |

FOREIGN PATENT DOCUMENTS

| | | |
|---|---|---|
| EP | 1746518 | 1/2007 |
| JP | 06149742 | 5/1994 |
| JP | 2000-201363 | 7/2000 |
| JP | 2004-282762 | 10/2004 |
| KR | 1020000077258 | 12/2000 |
| KR | 1020050095485 | 9/2005 |
| KR | 1020050107151 | 11/2005 |
| KR | 1020060024600 | 3/2006 |
| KR | 1020060060198 | 6/2006 |
| WO | WO 2004/046864 | 6/2004 |

OTHER PUBLICATIONS

Joerg Ott; SDP Attributes for T.120 Data Conferencing Draft-ott-mmusic-sdp-t120-00.txt; The Internet Society; 2004; pp. 1-7.
John Bassil; Multimedia Over Mobile Networks Using the H-324 Family; The Institution of Electrical Engineers; IEE Savoy Place; pp. 4/1-4/5, 1996.

* cited by examiner

*Primary Examiner* — Matthew D. Anderson
*Assistant Examiner* — Shaima Q Aminzay
(74) *Attorney, Agent, or Firm* — Roylance, Abrams, Berdo & Goodman, LLP

(57) ABSTRACT

A remote control-based data sharing system and method for handheld terminals over a communication network are provided. The data sharing system includes a master terminal that transmits a control assignment request and displays a screen image received in response to the control assignment request; a slave terminal that selectively assigns a control to the master terminal in response to the control assignment request and operates in accordance with a control signal received from the master terminal; and a network that establishes wireless communication channels with the master and slave terminals for exchanging signals between the master and slave terminals.

16 Claims, 5 Drawing Sheets

DATA SHARING SYSTEM AND METHOD FOR HANDHELD TERMINALS OVER MOBILE COMMUNICATION NETWORK

CROSS-REFERENCE TO RELATED APPLICATIONS

This application claims the benefit under 35 U.S.C. §119 (a) of a Korean Patent Application filed in the Korean Intellectual Property Office on Jul. 6, 2006 and assigned Serial No. 2006-0063422, the entire disclosure of which is hereby incorporated by reference.

BACKGROUND OF THE INVENTION

1. Field of the Invention

The present invention relates to a handheld terminal. More particularly, the present invention relates to a remote control based data sharing system and method for a handheld terminal over a communication network.

2. Description of the Related Art

Recent advances in battery and chip technologies have facilitated the miniaturization of handheld communication terminals even with various additional functions.

The handheld communication terminals have been integrated with various digital devices such as music player modules, camera modules, and video camera modules, among others.

These multimedia modules operate with various application programs and generate and handle large data such as sound files and image files. As the utilization of such multimedia modules expands, memories with large capacities and the sharing of the data between the handheld communication terminals are required. Recent memory chip technology has partially solved the capacity problems and the data sharing has been implemented with a direct infrared communication over a short range.

However, the conventional mobile communication system and terminals do not provide a data sharing mechanism between remotely located communication terminals.

Accordingly, there is a need for an improved data sharing system and method for handheld terminals in which a handheld terminal can control another handheld terminal in a remote location over a communication network.

SUMMARY OF THE INVENTION

An aspect of exemplary embodiments of the present invention is to address at least the above problems and or disadvantages and to provide at least the advantages described below. Accordingly, an aspect of exemplary embodiments of the present invention is to provide a data sharing system and method for handheld terminals in which a handheld terminal can control another handheld terminal located at a remote place over a communication network.

It is another object of an exemplary embodiment of the present invention to provide a data sharing system and method for handheld terminals in which a master terminal can control a slave terminal in a remote location, by monitoring a screen of the slave terminal.

According to an exemplary embodiment of the present invention, a data sharing system and method for handheld terminals is provided in which a master terminal controls the ability to download update data from a slave terminal to maintain the data in the latest version.

It is still another object of an exemplary embodiment of the present invention to provide a data sharing system and method for handheld terminals in which a master terminal monitors a screen image of a slave terminal through a video conferencing channel and controls the slave terminal while verifying the screen of the slave terminal.

In accordance with one aspect of an exemplary embodiment of the present invention, the above and other objects can be accomplished through a data sharing system for handheld terminals over a mobile communication network. The data sharing system of an exemplary embodiment of the present invention includes a master terminal, a slave terminal and a network. The master terminal transmits a control assignment request and displays a screen image received in response to the control assignment request. The slave terminal selectively assigns a control to the master terminal in response to the control assignment request and operates in accordance with a control signal received from the master terminal. The network establishes wireless communication channels with the master and slave terminals for exchanging signals between the master and slave terminals.

Preferably, the communication channel is a video conference channel.

Preferably, the video conference channel is defined by an H324M protocol.

Preferably, the master and slave terminals are coupled with each other through a T120 logical channel and have a T120 control signal table.

Preferably, the communication channel includes a video channel for exchanging video streams between the master and slave terminals, and a data channel for exchanging the control signals between the master and slave terminals.

In accordance with another aspect of an exemplary embodiment of the present invention, the above and other objects can be accomplished by a data sharing system for handheld terminals over a mobile communication network. The data sharing system includes a master terminal, a slave terminal and a network. The master terminal transmits a control assignment request signal and control signals, displays a screen image received in response to the control assignment request signal and receives data indicated by the control signal. The slave terminal selectively assigns a control to the master terminal in response to the control assignment request signal and transmits display information currently presented to the master terminal, and operates in accordance with the control signals from the master terminal. The network establishes wireless communication channels with the master and slave terminals to exchange signals between the master and slave terminals.

According to an exemplary implementation, the data includes photographs, motion pictures, and phone books.

According to an exemplary implementation, the communication channel is a video conference channel defined by an H324M protocol.

According to an exemplary implementation, the master and slave terminals are coupled with each other through a T120 logical channel and have a T120 control signal table.

According to an exemplary implementation, the communication channel includes a video channel for exchanging video streams between the master and slave terminals, and a data channel for exchanging the control signals between the master and slave terminals.

In accordance with another aspect of an exemplary embodiment of the present invention, the above and other objects can be accomplished by a data sharing method for handheld terminals over a mobile communication network. A video conference channel is established between a master and a slave terminal. A control of the slave terminal is assigned to the master terminal and display information presented at the slave terminal is transmitted to the master terminal. Data stored in the slave terminal indicated by the master terminal using the display information is transmitted to the master terminal.

During the establishment of a video conference channel, a T120 logical channel exists between the master and slave terminals and a determination of whether both the master and slave terminals have a T120 control signal table is made.

In an exemplary implementation, a video conference channel is established when a call setup is performed, a call alarm is performed, H324 protocol is initialized and a determination is made as to whether T120 control is available.

According to an exemplary implementation, a control of the slave terminal is assigned to the master terminal when a request for a control assignment from the master terminal to the slave terminal is transmitted. Assignment also occurs when the control assignment is permitted at the slave terminal and when the control of the slave terminal is assigned to the master terminal.

In an exemplary implementation, display information is transmitted when the display information presented at the slave terminal is stored into a buffer. Transmission also occurs when the display information stored in the buffer is decoded, an RGB buffer is updated with the decoded display information, and when the display information updated in the RGB buffer is transmitted to the master terminal.

In an exemplary implementation, data stored in the slave terminal is transmitted when the data stored in the slave terminal is verified at the master terminal, an indication is made of specific data to receive, the indicated data is received from the slave terminal, the received data is compared with previously stored original data and the original data is updated with the received data according to a comparison result.

In an exemplary implementation, the indicated data is transmitted to the master terminal automatically or transmitted or rejected manually according to a preset configuration of the slave terminal.

According to an exemplary implementation, the data includes photographs, motion pictures, and phone books.

In an exemplary implementation, the video conference channel includes a video channel for exchanging video streams between the master and slave terminals and a data channel for exchanging the control signals between the master and slave terminals.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

According to an exemplary embodiment of the present invention, a handheld terminal that participates in a data sharing session may assign its control to another handheld terminal such that the two handheld terminals become a master and a slave terminal, respectively.

An exemplary embodiment of the present invention is described using a handheld terminal having a camera module supporting a video conferencing function. However, the handheld terminal can be replaced by a cellular phone, personal communication service (PCS) phone, dedicated DMB receiver, smart phone, International Mobile Telecommunication 2000 (IMT-2000) terminal, Universal Mobile Telecommunication Service (UMTS) terminal, laptop computer, and personal computer, among others.

In this exemplary embodiment of the present invention, a master terminal is a handheld terminal assigned a control of another handheld terminal. A slave terminal is a handheld terminal that assigns its control to the other handheld terminal. Accordingly, the master terminal controls the slave terminal located in a remote place.

To be a master or slave terminal depends on which terminal requests a remote control, and a handheld terminal can be in a state of either a master or a slave terminal.

A video stream between the master and slave terminals is exchanged on a video channel of H324M protocol and control signals are exchanged on a signaling channel. In an exemplary embodiment of the present invention, the video channel and signaling channel are referred to as 'channels' or 'communication channels.'

Figure 1:
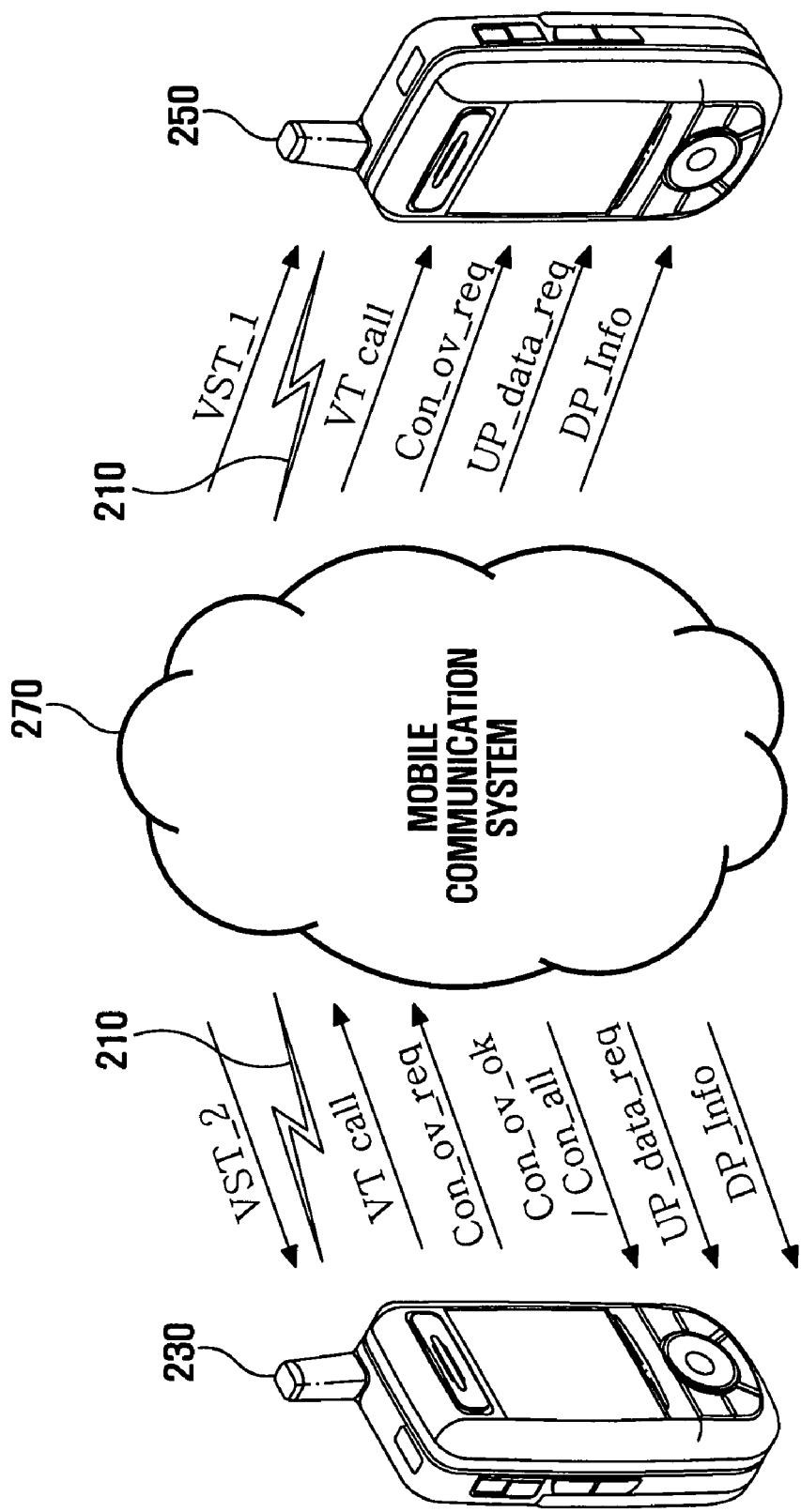
FIG. 1 is a schematic view illustrating a remote control-based data sharing system according to an exemplary embodiment of the present invention.

FIG. 1 is a schematic view illustrating a remote control-based data sharing system according to an exemplary embodiment of the present invention.

According to an exemplary embodiment of the present invention, the data sharing system of FIG. 1 includes a master terminal 230 that requests a control (Con_all) and a slave terminal 250 that assigns its control (Con_all) to the master terminal 230. The master and slave terminals are connected through a wireless communication system 270.

The master terminal 230 and the slave terminal 250 are associated with the wireless communication system 270 through communication channels 210 such that the master terminal 230 transmits a control assignment request (Con_ov_req) message to the slave terminal 250 and receives the control (Con_all) of the slave terminal 250 in response to the Con_ov_req through the communication channels 210.

Upon receiving the Con_all, the master terminal 230 can control the slave terminal 250.

After the control of the slave terminal has been obtained, the master terminal 230 transmits an update required data request (UP_data_req) message to the slave terminal 250. Once the update required data request message has been received, the slave terminal 250 transmits the update data (UP_data) requested by the update required data request message.

The master terminal 230 transmits a first video stream (VST_1) to the slave terminal 250 for a video conference.

The slave terminal 250 receives a control assignment request (Con_ov_req) message from the master terminal 230 and transmits a control allowance (Con_ov_ok) message and assigns the control (Con_all) to the master terminal 230 in response to the control assignment request (Con_ov_req) message.

After the control (Con_all) to the master terminal 230 has been assigned, the slave terminal 250 transmits a second video stream (VST_2) to the master terminal 230, the second video stream representing a screen image displayed at the slave terminal 250. Accordingly, the master terminal 230 can control the slave terminal 250 with the second screen image.

The slave terminal 250 automatically or manually transmits the update data (UP_data) indicated by the master terminal 230 under the control of the master terminal 230.

Structures of the master and slave terminal 230 and 250 will be described with reference to FIG. 2.

Figure 2:
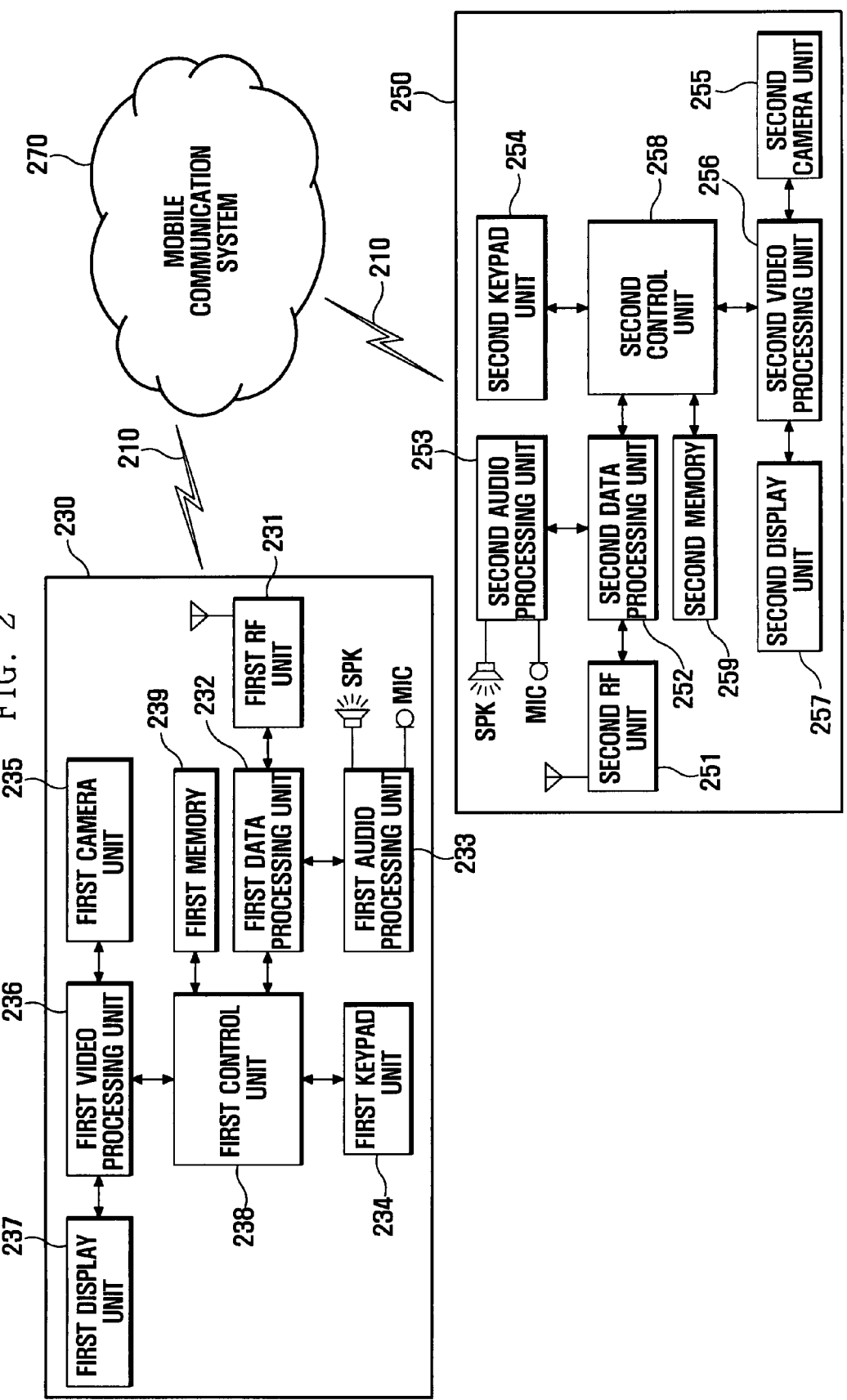
FIG. 2 is a block diagram illustrating a configuration of the master and slave terminals of FIG. 1.

FIG. 2 is a block diagram illustrating a configuration of the master and slave terminals of FIG. 1.

According to an exemplary embodiment of the present invention, the master terminal 230 and the slave terminal 250 of FIG. 2 each include an input means, a processing means, a storage means, an output means, and a communication means.

The input means includes an audio processing unit 233 for the master terminal 230 (253 for the slave terminal 250) for processing audio data input through a microphone, a keypad unit 234 (254) for allowing input of alphanumeric data, and a camera unit 235 (255) for taking images externally.

A display unit 237 (257) as an output terminal can be included in the input means if the display unit 237 (257) is implemented with a liquid crystal display (LCD) in the form of a touch screen. The input means is responsible for inputting a video stream which consists of alphanumeric, audio and video data.

The processing means includes a video processing unit 236 (256) for converting analog video data input through the camera unit 235 (255) into digital data, a data processing unit 232 (252) for processing audio data received from the audio processing unit 233 (253) and the alphanumeric data input through the keypad unit 234 (254), and a control unit 238 (258) for controlling the overall operation of the units, generating control signals, and performing operations on the basis of the control signals.

The storage means includes a memory 239 (259) for storing user data input through the input means, video data input through the camera unit 235 (255), and audio data input through the audio processing unit 233 (253).

The output means includes the display unit 237 (257) for displaying screen images corresponding to input or requested user and application data and the audio processing unit 233 (253) for outputting the audio data contained in the video stream.

That is, the output means displays the images associated with the user data input through the input means, read from the storage means, and taken by the camera unit 235 (255).

The communication means includes a radio frequency (RF) unit 231 (251) for up-converting signals to be transmitted and down-converting the received signal, and at least one antenna.

In more detail, the RF unit 231 (251) includes an RF transmitter for up-converting and amplifying the outgoing signal and an RF receiver for low-noise amplifying and down-converting the received signals. The RF unit 231 (251) facilitates the master terminal's 250 and the slave terminal's 230 ability to establish a communication channel 210 to the communication system 270.

The communication channel 210 can be defined by various communication systems such as Code Division Multiple Access (CDMA), Frequency Division Multiple Access (FDMA), Time Division Multiple Access, Wideband CDMA (WCDMA), Wireless Broadband Internet (WiBro), Universal Mobile Telecommunication System (UMTS), and Orthogonal Frequency Division Multiple Access (OFDMA), among others. Preferably, the communication channel 210 is defined, in consideration of the popularity, by any of CDMA, WiBro, and a combination of CDMA and WiBro.

The communication channel 210 uses T120 logical channel of H324M protocol for the video conference between the handheld terminals 230 and 250. The signals such as control assignment request (Con_ov_req), control allowance (Con_ov_ok), and Control (Con_all) required for controlling the slave terminal 250 are exchanged through the video channel for the first and second video stream (VST_1 and VST_2).

Display information (DP_Info) associated with the screen image of the slave terminal 250 is transmitted to the master terminal 230 through the communication channel 210. The master terminal 230 transmits control signals required for controlling the slave terminal while monitoring the real time screen image of the slave terminal 250, resulting in effective control of the slave terminal 250.

Also, the information on the communication channel 210 is stored in the slave terminal so that the communication channel 210 can be used for transmitting the update data (UP_data) indicated by the master terminal.

In this exemplary embodiment of the present invention, an assumption is made that a T120 logical channel is established between the master and slave terminals 230 and 250, and a T120 signal table is shared by the master and slave terminals 230 and 250.

The data processing unit 232 (252) includes an encode/modulation module for performing encoding and modulation on the signal to be transmitted such as a video conference call signal or the update data and a decode/demodulation module for performing demodulation and decoding on the received signal.

The first data processing unit 232 of the master terminal 230 performs encoding and modulation on the first video stream (VST_1) to be transmitted through the first RF unit 231, for a video conference; and performs demodulation and decoding on the second video stream (VST_2) received from the slave terminal 250 through the first RF unit 231. Similarly, the second data processing unit 252 of the slave terminal 250 processes the video conference data exchanged between the master terminal 230 and slave terminal 250.

The first data processing unit 232 of the master terminal 230 ceases to transmit the first video stream (VST_1), which represents the screen image of the master terminal 230, and just receives the second video stream (VST_2) transmitted from the slave terminal 250 once the control of the slave terminal 250 is obtained.

The first data processing unit 232 transmits the control signals generated for controlling the slave terminal 250 to the slave terminal 250. Upon receiving a control signal from the master terminal 230, the second data processing unit 252 of the slave terminal 250 transfers the control signal to the second control unit 258 of the slave terminal 250.

The first and second audio processing units 233 and 253 play back the audio signals output from, respectively, the first and second data processing units 232 and 252 or transmit the audio signal input through the microphone to, respectively, the first and second data processing units 232 and 252.

The first and second keypad units 234 and 254 include a plurality of alphanumeric keys and function keys for inputting alphanumeric data and instructions for operating the functions.

The master terminal 230 uses the first keypad unit 234 to facilitate the input of a phone number of the slave terminal 250 and to generate a video conference call (VT_call) by pressing a send button. After the video conference call is established, key input for transmitting a control assignment request (Con_ov_req) message to the slave terminal 230 is performed. Once the master terminal 230 obtains the control (Con_all) of the slave terminal 250, key inputs for controlling the slave terminal 250 and for indicating specific data stored in the second memory 259 of the slave terminal 250 as target update data can be performed.

The slave terminal 250 and the second keypad unit 254 provide a key input for transmitting a response to the video conference call (VT_call) to the master terminal 230 such that the video conference call is established. After establishing the video conference call, key input for transmitting a control allowance (Con_ov_ok) message is performed in response to the control assignment request (Con_ov_req) message from the master terminal 230, resulting in assignment of the control.

If an update data indication message, which indicates and requests to transmit specific data stored in the second memory 259 of the slave terminal 250, is received, the slave terminal 250 allows or denies the request according to a key input performed with the second keypad unit 254 after assignment of the control.

The first and second memory 239 and 259 may each include a program memory and a data memory. The program memory stores programs for controlling general operations of the handheld terminal and the data memory stores data generated inside the handheld terminal or received from other terminals, such as photographs, motion pictures, and phone books, among others.

The camera unit 235 (255) takes a picture and transmits the digital video signal to the video processing unit 236 (256).

The video processing unit 236 (256) converts the analog video signal output from the camera unit 235 (255) and outputs the signal as an image signal to be displayed.

The video processing unit 236 (256) transmits the analog video signal output from the camera unit 235 (255) to the control unit 238 (258) and displays a received digital video signal on the display unit 237 (257).

The master terminal 230 transmits the image taken by the first camera 235 to the first video processing unit 236 and the first video processing unit 236 transmits the video signal to the first control unit 238. The first video processing unit 236 of the master terminal 230 replays the video signal received from the slave terminal 250 to be displayed on the first display unit 237.

The slave terminal 250 operates in a manner similar to that of the master terminal 230 during a video conference session.

According to an exemplary implementation, the master terminal 230 controls the slave terminal 250 by obtaining the control (Con_all) of the slave terminal 250, the master terminal 230 receives the screen image displayed on the second display unit 257 of the slave terminal 250 as the second video stream (VST_2) and displays the received screen image of the slave terminal 250 on the first display unit 237 of the master terminal 230. The video processing units 236 and 256 also perform compression and decompression on the video streams exchanged between the master terminal 230 and slave terminal 250.

The display unit 237 (257) displays the image taken and transmitted by the camera unit 255 (235) of the counterpart terminal 250 (230) during the video conference session.

The first display unit 237 of the master terminal 230 displays the image taken by the second camera unit 255 of the slave terminal 250 and the second display unit 257 of the slave terminal 250 displays the image taken by the first camera unit 235 of the master terminal 230.

According to an exemplary implementation, the master terminal 230 controls the slave terminal 250, the first display unit 237 of the master terminal 230 displays the screen image, such as the display information (DP_Info) presented on the second display unit 257 of the slave terminal 250.

The first and second display unit 237 and 257 of the master and slave terminals 230 and 250 present the same screen image while the master terminal 230 controls the slave terminal 250.

The control unit 238 (258) is responsible for controlling the overall operation of the handheld terminal. That is, the control unit 238 (258) controls interoperation and cooperation among the data processing unit 232 (252), the keypad unit 234 (254), the memory unit 239 (259), and the video processing unit 236 (256).

The first control unit 238 of the master terminal 230 generates a first video stream (VST_1) by using a video signal obtained from the first video processing unit 236 and an audio signal obtained from the first audio processing unit 233 and transmits the first video stream (VST_1) to the slave terminal 250 through the first RF unit 231.

That is, the first control unit 238 generates the first video stream (VST_1) using the video and audio signals and transmits the first video stream (VST_1) to the first data processing unit 232.

When the master terminal 230 controls the slave terminal 250, the first control unit 238 of the master terminal 230 generates a control assignment request (Con_ov_req) message corresponding to a command input through the first keypad unit 234 and transmits the control assignment request (Con_ov_req) message to the slave terminal 250.

If the control allowance (Con_ov_ok) message is received from the slave terminal 250 in response to the control assignment request (Con_ov_req) message, the first control unit 238 of the master terminal 230 generates various control messages corresponding to commands input through the first keypad unit 234 and transmits the control messages to the slave terminal 250.

The second control unit 258 of the slave terminal 250 generates a second video stream (VST_2) using a video signal obtained from the second video processing unit 256 and an audio signal obtained by the second audio processing unit 253 and transmits the second video stream (VST_2) to the master terminal 230 through the second RF unit 251.

That is, the second control unit 258 generates the second video stream (VST_2) using the video and audio signals and transmits the second video stream (VST_2) to the second data processing unit 252.

Upon receiving the control assignment request (Con_ov_req) message from the master terminal 230, the second control unit 258 of the slave terminal 250 generates a control allowance (Con_ov_ok) message and transmits the control allowance (Con_ov_ok) message to the master terminal 230 in response to the control assignment request (Con_ov_req) message.

After transmitting the control allowance (Con_ov_ok) message together with the control of the slave terminal 250, the second control unit 258 transmits the display information (DP_Info) including the screen image presented on the second display unit 257 to the master terminal 230. Accordingly, the master terminal 230 can control the slave terminal 250, by monitoring the status of the slave terminal 250 with reference to the screen image of the slave terminal 250.

If a control message generated by a key manipulation of the master terminal 230 is received, the second control unit 258 of the slave terminal 250 regards the control signal as the control signal generated by a key manipulation through the second keypad unit 254 of the slave terminal 250.

If an update data request (UP_data_req) indicating specific data (for example, a photograph, a motion picture, or a phonebook) stored in the second memory 259 of the slave terminal 250 is received from the master terminal 230, the second control unit 258 of the slave terminal 250 transmits the data (UP_data) indicated by the update data request (UP_data_req) to the master terminal 230 or rejects to transmit the data (UP_data) automatically or manually according to a preset configuration.

The communication system 270 bridges the video conference call (VT_call) signals for establishing a video conference channel between the master and slave terminals 230 and 250 and supports the exchange of the control signals and video streams (VST_1 and VST_2) between the master and slave terminals 230 and 250.

Figure 3:
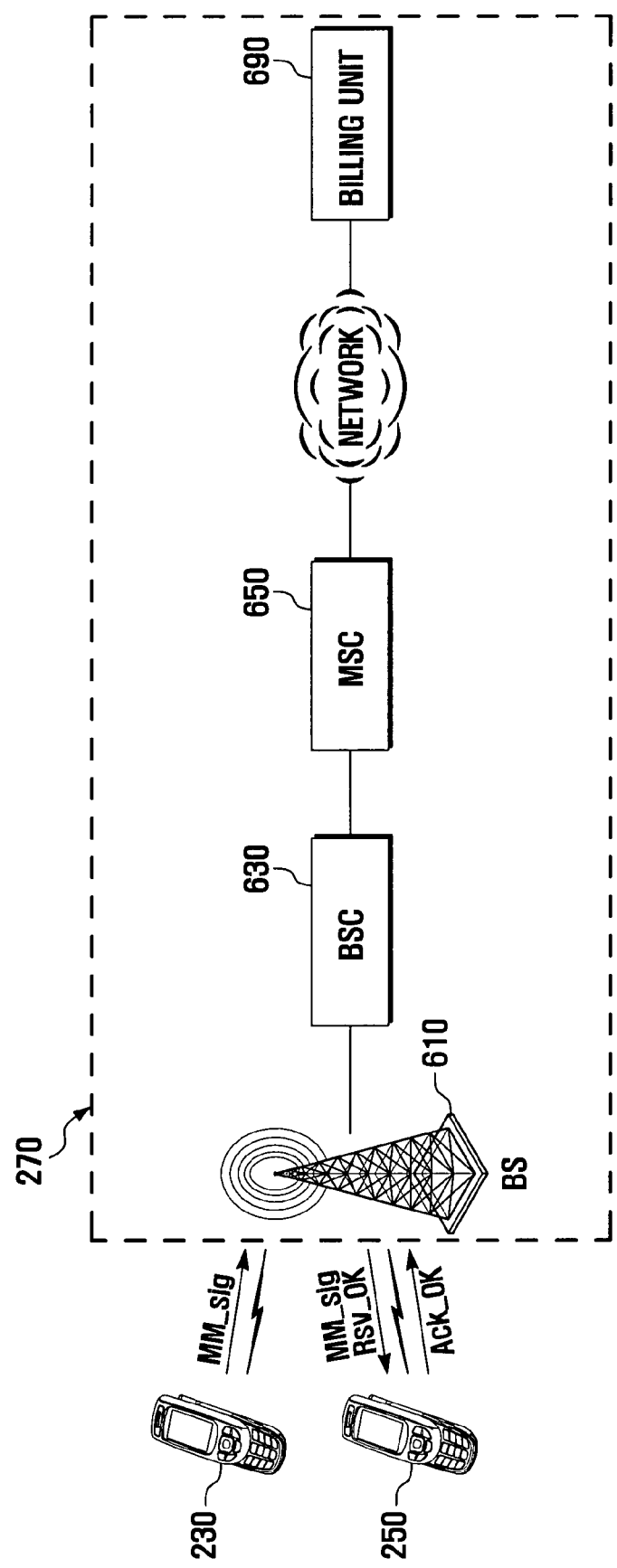
FIG. 3 is a schematic block diagram illustrating the communication system of FIG. 1 in more detail.

FIG. 3 is a schematic block diagram illustrating the communication system 270 of FIG. 1 in more detail.

Referring to FIG. 3, the communication system 270 includes a base station (BS) 610 associated with the master and slave terminals 230 and 250, a base station controller (BSC) 630, a mobile switching center (MSC) 650, a message service center 670, and a billing unit 690.

The BS 610 associates with the master and slave terminals 230 and 250 thorough respective wireless channels to exchange voice and data. The BS 610 performs processing of baseband signals, interfacing between wire and wireless network, and serving wireless accesses. The BS 610 is a terminal element of the communication network 270.

The BSC 630 is located between the BS 610 and the MSC 650 and manages and controls the BS 610. The BSC 630 is responsible for assigning and releasing channels to and from the handheld terminals 230 and 250, for controlling transmission power of the handheld terminals 230 and 250 and the BS 610, for managing and maintaining the BS 610, and for performing a handover between base stations.

The MSC 650 is a network element that performs switching functions and manages the communications between the handheld terminals 230 and 250. The MSC 650 also processes basic and additional services, incoming and outgoing calls of the subscriber, location registrations, and handovers, among others. In this exemplary embodiment of the present invention, the MSC 650 processes the first and second video streams (VST_1 and VST_2) exchanged between the master and slave terminals 230 and 250.

The billing unit 690 performs accounting for the communication channels 210 established between the master and slave terminals 230 and 250.

The billing unit 690 charges payment to the master terminal 230 or to both the master and slave terminals 230 and 250 for the utilization of the communication channels 210. The billing unit 690 can be ignored in accordance with the service type.

The operation of the above-structured data sharing system is described hereinafter with reference to FIGS. 4 and 5.

Figure 4:
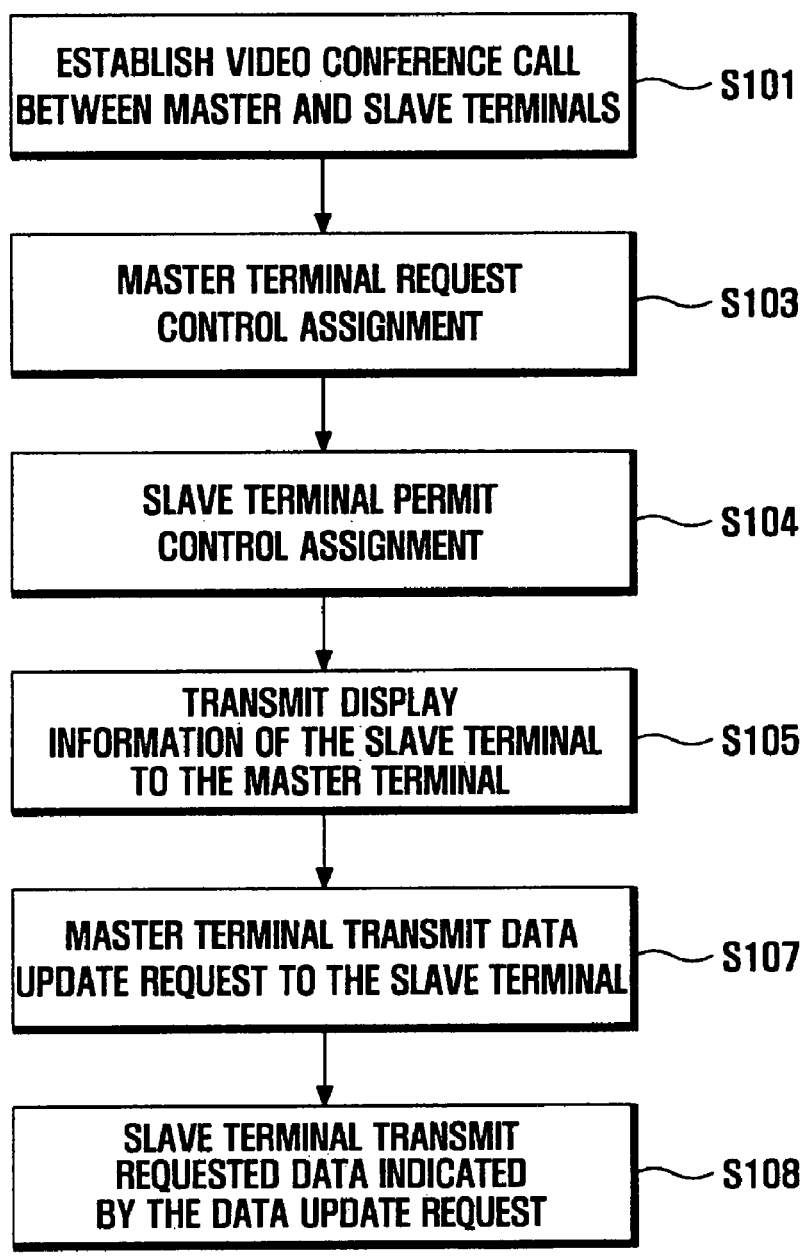
FIG. 4 is a flowchart illustrating a data sharing method for a wireless communication system according to an exemplary embodiment of the present invention.
Figure 5:
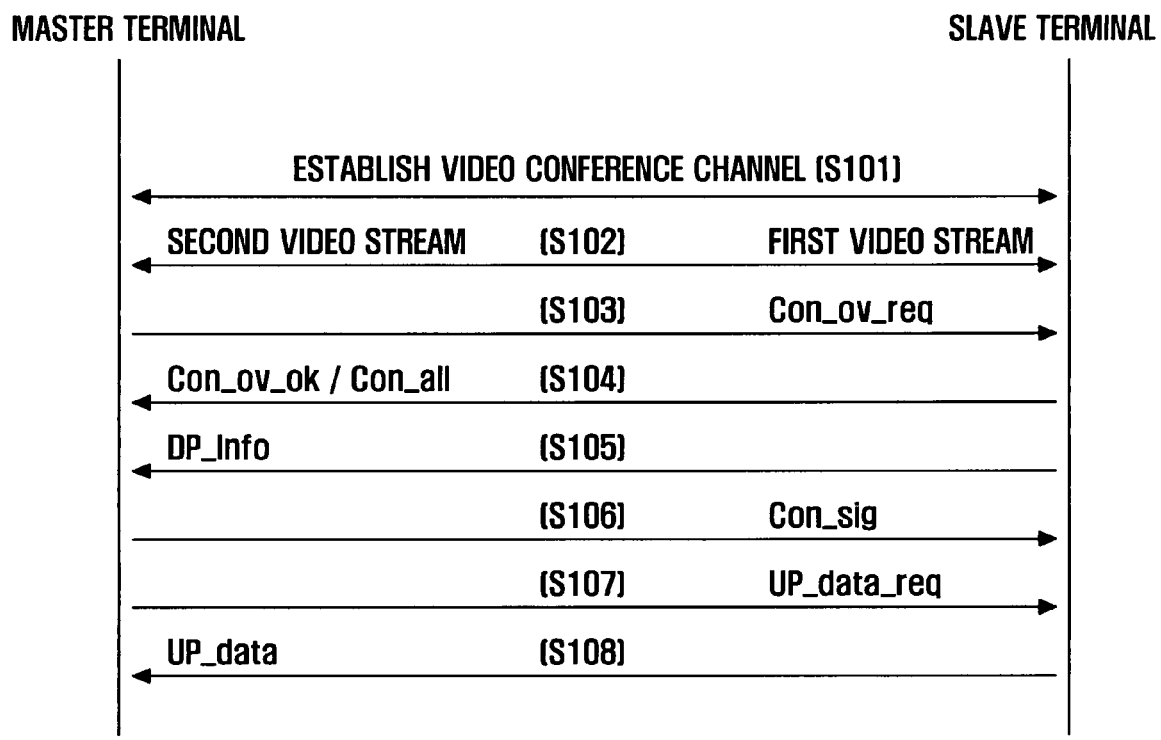
FIG. 5 is a message flow diagram illustrating the data sharing method of FIG. 4.

FIG. 4 is a flowchart illustrating a data sharing method for a wireless communication system, according to an exemplary embodiment of the present invention, and FIG. 5 is a message flow diagram illustrating the data sharing method of FIG. 4.

Referring to FIGS. 4 and 5, the master and slave terminals 230 and 250 initially exchange video conference call (VT_call) messages for establishing a video conference channel (S101).

The video conference channel is established in so that the master terminal 230 transmits a video conference call (VT_call) to the slave terminal 250 through the communication system 270 and the slave terminal 250 transmits a response message to the master terminal 230.

During the initial connection between the handheld terminals, according to H.245 protocol, the hand held terminals verify whether the T120 logical channel is activated and the counterpart terminal has a T120 control signal table.

The video conference channel is established between the master and slave terminals 230 and 250. The control of the T120 logical channel, after call setup procedure, call alarming procedure, H.324M protocol initialization procedure, and capacity negotiation procedure facilitate the establishment of the video conference channel between the master and slave terminals 230 and 250.

After establishment of the video conference channel, the master terminal 230 generates the first video stream (VST_1) using the video signal output from the first camera unit 235 and the audio signal output from the first audio processing unit 233 and then transmits the first video stream (VST_1) to the slave terminal 250. The slave terminal 250 simultaneously generates the second video stream (VST_2) using the video signal output from the second camera unit 255 and the audio signal output from the second audio processing unit 253 and then transmits the second video stream (VST_2) to the master terminal 230.

Next, the master terminal 230 transmits a control assignment request (Con_ov_req) message to the slave terminal 250 (S103). That is, the master terminal 230 generates the control assignment request (Con_ov_req) message and transmits the control assignment request (Con_ov_req) message to the slave terminal 250 in accordance with an input command. The commands for generating and transmitting the control assignment request (Con_ov_ok) message are input by predetermined key manipulations.

Upon receiving the control assignment request (Con_ov_rok) message, the slave terminal 250 transmits the control allowance message (Con_ov_ok) to the master terminal 230 to assign the control (Con_all) (S104).

The slave terminal 250 generates the control allowance (Con_ov_ok) message in response to the control assignment request (Con_ov_req) and transmits the control allowance (Con_ov_ok) message to the master terminal 230, resulting in assignment of the control of the slave terminal 250.

The control allowance (Con_ov_ok) message can be replaced by an acknowledgement (Ack) message in response to the control assignment request (Con_ov_req) message.

Upon obtaining the control of the slave terminal 250, the master terminal 230 can control the slave terminal 250 while displaying the display information (DP_Info) including the screen image presented on the display unit of the slave terminal 250 (S105).

The slave terminal 250 transmits the display information (DP_Info) of the slave terminal 250 to the master terminal 230 in real time such that the master terminal 230 can control the slave terminal with reference to the real time display information (DP_Info) of the slave terminal 250, that is displayed on the first display unit 237 of the master terminal 230.

In order to transmit the display information (DP_Info), the slave terminal 250 stores the screen information displayed on the second display unit 257 into an RGB buffer, decodes the buffered screen information, and performs an RGB buffer update on the screen information. The screen image stored in the RGB buffer is transmitted to the master terminal 230.

That is, the master terminal 230 can control the slave terminal 250 by transmitting control signals (Con_sig) generated by inputting identical commands used to control the master terminal 230 while displaying the screen image of the slave terminal 250.

Finally, the master terminal 230 transmits an update data request (UP_data_req) message indicating specific data stored in the second memory 259 (S107). In response to the update data request (UP_data_req) message, the slave terminal 250 transmits the update data (UP_data) to the master terminal 230 or rejects to transmit the update data (UP_data) automatically or manually according to a preset configuration (S108).

The master terminal 230 verifies the data stored in the second memory 259 of the slave terminal 250 from the display information (DP_Info) of the slave terminal 250, which is presented on the first display unit 237, and selects specific data as update data (UP_data) from the second memory 250 at steps S107 and S108.

If the master terminal 230 requests the slave terminal 250 to transmit the selected update data (UP_data), the slave terminal 250 transmits the update data (UP_data) to the master terminal.

The slave terminal 250 may be configured to automatically transmit the update data (UP_data) upon receiving the update data request (UP_data_req) message or to manually allow or reject the transmission of the update data (UP_data).

According to an exemplary implementation, the master terminal 230 requests the slave terminal 250 to transmit the update data (UP_data), the slave terminal 250 determines whether or not to transmit the request data, and transmits the update data according to the determination result.

Upon receiving the update data (UP_data), the master terminal 230 stores the received update data (UP_data) and compares the update data with previously stored original data. If a version of the update data is higher than that of the original data or the update data is modified later than the original data, the master terminal 230 replaces the original data with the update data.

The data stored in the first memory 239 of the master terminal 230 can be maintained as the latest data by comparing the originally stored data and the data stored in the slave terminal 250 and updating the data if it is required.

As described above, the data sharing system and method of an exemplary embodiment of the present invention allows a handheld terminal (slave terminal) to assign its control to another handheld terminal (master terminal) such that the master terminal can remotely control the slave terminal and update its data by referring to identical data.

Further, the data sharing system and method of an exemplary embodiment of the present invention establishes a communication channel between a master and a slave terminal, assigns the control of the slave terminal to the master terminal, and presents the screen image of the slave terminal on a display of the master terminal, such that the master terminal can effectively control the slave terminal.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A data sharing system for handheld terminals over a mobile communication network, comprising:
    a master terminal for transmitting a control assignment request and displaying a screen image received in response to the control assignment request;
    a slave terminal for selectively assigning a control to the master terminal in response to the control assignment request and operating in accordance with a control signal received from the master terminal; and
    a network for establishing wireless communication channels with the master and slave terminals for exchanging signals between the master and slave terminals,
    wherein the master terminal is operable to select data stored in a memory of the slave terminal from the displayed screen image, and to transmit a data request message indicating the selected data to the slave terminal, and the slave terminal is further operable to transmit the selected data to the master terminal in response to receiving the data request message.

2. The data sharing system of claim 1, wherein the communication channel comprises a video conference channel.

3. The data sharing system of claim 2, wherein the video conference channel is defined by an H324M protocol.

4. The data sharing system of claim 1, wherein the master terminal is coupled to the slave terminal through a T120 logical channel and each comprise a T120 control signal table.

5. The data sharing system of claim 1, wherein the communication channel comprises at least one of:
    a video channel for exchanging video streams between the master and slave terminals; and
    a data channel for exchanging the control signals between the master and slave terminals.

6. A data sharing method for handheld terminals over a mobile communication network, comprising:
    establishing a video conference channel between a master and a slave terminal;
    assigning a control of the slave terminal to the master terminal;
    transmitting display information presented at the slave terminal to the master terminal;
    transmitting data stored in the slave terminal indicated by the master terminal using the display information to the master terminal,
    wherein the master terminal is operable to select data stored in a memory of the slave terminal from the displayed screen image, and to transmit a data request message indicating the selected data to the slave terminal, and the slave terminal is further operable to transmit the selected data to the master terminal in response to receiving the data request message.

7. The data sharing method of claim 6, wherein establishing a video conference channel comprises:
    verifying that a T120 logical channel exists between the master and slave terminals; and
    determining whether both the master and slave terminals have a T120 control signal table.

8. The data sharing method of claim 6, wherein establishing a video conference channel comprises:
- performing a call setup;
- performing a call alarm;
- initializing H324 protocol; and
- determining whether T120 control is available.

9. The data sharing method of claim 6, wherein assigning a control of the slave terminal to the master terminal comprises:
- transmitting a request for a control assignment from the master terminal to the slave terminal;
- permitting, at the slave terminal, the control assignment; and
- assigning the control of the slave terminal to the master terminal.

10. The data sharing method of claim 6, wherein transmitting display information comprises:
- storing the display information presented at the slave terminal into a buffer;
- decoding the display information stored in the buffer;
- updating a Red Green Blue (RGB) buffer with the decoded display information; and
- transmitting the display information updated in the RGB buffer to the master terminal.

11. The data sharing method of claim 6, wherein transmitting data stored in the slave terminal comprises:
- verifying, at the master terminal, the data stored in the slave terminal;
- indicating specific data to receive;
- receiving the indicated data from the slave terminal;
- comparing the received data with previously stored original data; and
- updating the original data with the received data according to a comparison result.

12. The data sharing method of claim 11, wherein the indicated data is transmitted to the master terminal automatically or transmitted or rejected manually according to a configuration of the slave terminal.

13. The data sharing method of claim 11, wherein the data comprises at least one of photographs, motion pictures, and phone books.

14. The data sharing method of claim 6, wherein the video conference channel comprises:
- a video channel for exchanging video streams between the master and slave terminals; and
- a data channel for exchanging the control signals between the master and slave terminals.

15. A master terminal, comprising:
- a radio frequency (RF) unit for establishing wireless communication channels with another handheld terminal;
- a control unit for controlling the other handheld terminal by a control assignment assigned from the other handheld terminal through the wireless communication channels;
- a display unit for displaying screen information displayed on the other handheld terminal,
- wherein the control unit further controls to select data stored in a memory of the other handheld terminal from the displayed screen image, and to transmit a data request message indicating the selected data to the other handheld terminal.

16. A slave terminal, comprising:
- a radio frequency (RF) unit for establishing wireless communication channels with another handheld terminal;
- a control unit for assigning control assignment of the other handheld terminal based on the radio frequency (RF) unit, for transmitting screen information displayed on the slave terminal to the other handheld terminal, and for controlling operations based on the control signals transmitted from the other handheld terminal,
- wherein in response to receiving a data request message, the control unit further selects data stored in a memory of the slave terminal from the displayed screen image, and to transmit a data request message indicating the selected data to the other handheld terminal.

* * * * *